United States Patent [19]
Schuster

[11] Patent Number: 5,012,331
[45] Date of Patent: Apr. 30, 1991

[54] GRAPHICS ENCODER VIDEO ENHANCEMENT

[75] Inventor: Daniel L. Schuster, Portland, Oreg.

[73] Assignee: Magni Systems, Inc., Beaverton, Oreg.

[21] Appl. No.: 370,915

[22] Filed: Jun. 23, 1989

[51] Int. Cl.$^5$ .............................................. H04N 9/64
[52] U.S. Cl. ...................................................... 358/37
[58] Field of Search ......................................... 358/37

[56] References Cited

U.S. PATENT DOCUMENTS

| | | | |
|---|---|---|---|
| 4,030,121 | 6/1977 | Faroudja | 358/37 |
| 4,721,998 | 1/1988 | Glenn | 358/37 |
| 4,814,859 | 3/1989 | Kimura et al. | 358/37 |

Primary Examiner—John W. Shepperd
Attorney, Agent, or Firm—Flehr, Hohbach, Test, Albritton & Herbert

[57] ABSTRACT

A color enhancement circuit according to the present invention extracts "sine-squared" (haversine) pulses representing absolute values for the derivatives of R-Y and B-Y color difference "sine-squared" transitions; multiples by offset, sign-inverted luminance, and adds the luminance-weighted "singe-squared" pulses to the composite video as color enhancement signals which exceed the NTSC-legal chroma bandwidth but are within the NTSC-legal luminance bandwidth. The pulses augment luminance during chroma transitions, restoring luminance contributions from chrominance which are lost when chroma subcarrier packet risetimes and bandwidth are limited by NTSC broadcast requirements.

8 Claims, 4 Drawing Sheets

FIG.—1

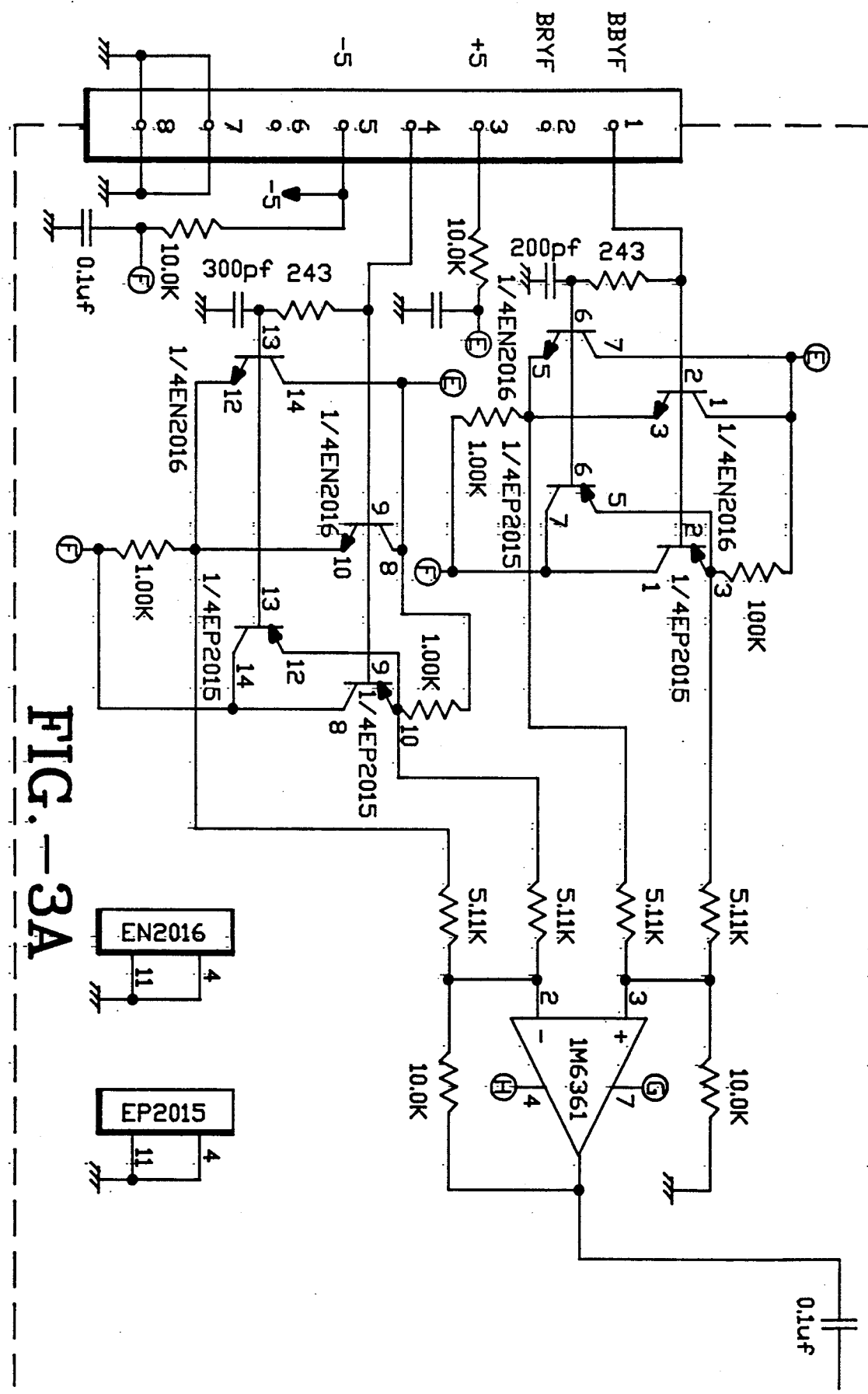
FIG.—3A

GRAPHICS ENCODER VIDEO ENHANCEMENT

BACKGROUND OF THE INVENTION

The present invention relates to a graphics encoder video enhancement apparatus and method for use in video display monitors and the like.

In the processing of color video signals, color enhancement is of course a very important aspect in any video monitor. Prior art approaches in general require significant signal processing of the video signal to provide improved enchancement capabilities with suitable bandwidth. Such approaches necessarily increase the cost and complexity of the apparatus.

It would be desirable to provide an improved graphics encoder video enhancement apparatus and method to generate an enchanced video signal having a suitable bandwidth and wherein the apparatus has reduced cost and complexity.

SUMMARY OF THE INVENTION

It is an object of the present invention to provide an improved graphics encoder video enhancement apparatus and corresponding method.

In one preferred embodiment, the color enhancement circuit according to the present invention extracts "sine-squared" (haversine) pulses representing absolute values for the derivatives of R-Y and B-Y color difference "sine-squared" transitions; multiplies by offset, sign-inverted luminance, and adds the luminance-weighted "sine-squared" pulses to the composite video as color enhancement signals which exceed the NTSC-legal chroma bandwidth but are within the NTSC-legal luminance bandwidth. The pulses augment luminance during chroma transitions, restoring luminance contributions from chrominance which are lost when chroma subcarrier packet risetimes and bandwidth are limited by NTSC broadcast requirements.

Additional objects, advantages and novel features of the present invention will be set forth in part in the description which follows and in part become apparent to those skilled in the art upon examination of the following or may be learned by practice of the invention. The objects and advantages of the invention may be realized and attained by means of the instrumentalities and combinations which are pointed out in the appended claims.

BRIEF DESCRIPTION OF THE DRAWINGS

The accompanying drawings which are incorporated in and form a part of this specification illustrate an embodiment of the invention and, together with the description, serve to explain the principles of the invention.

FIG. 3A and 3B depict a complete circuit diagram of the color enhancement circuit of FIG. 2.

DETAILED DESCRIPTION OF THE DRAWINGS

Figure 1:
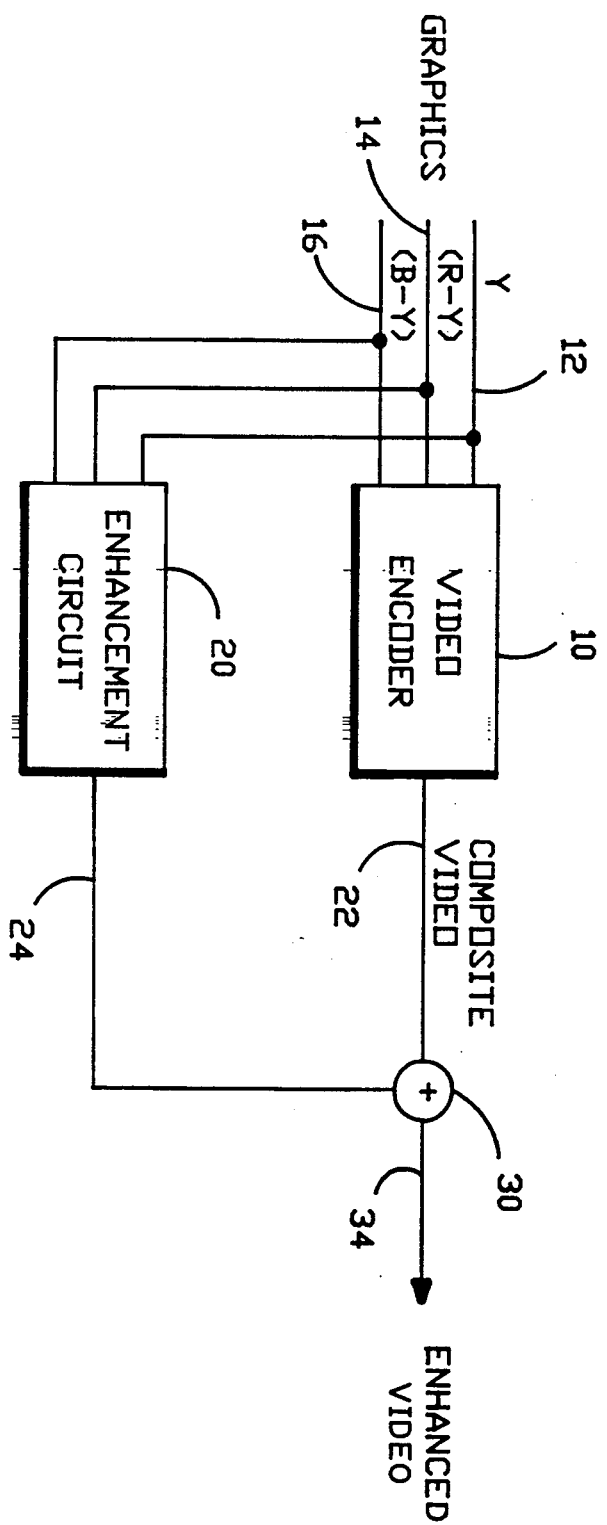
FIG. 1 depicts a block diagram of a graphic encoder video enhancement apparatus according to the present invention.

Reference will now be made in detail to the preferred embodiment of the invention, an example of which is illustrated in the accompanying drawings. While the invention will be described in conjunction with the preferred embodiment, it will be understood that it is not intended to limit the invention to that embodiment. On the contrary, it is intended to cover alternatives, modifications and equivalents as may be included within the spirit and scope of the invention as defined by the appended claims.

It is believee that a short glossary of terms will be helpful in understanding the aspects of the present invention. Those terms are defined as follows:

NTSC (National Television System Committee) is the name of two standardization groups, the first of which established the 525 scanning-line-per-frame/30 frame-per-second standard, and the second of which established the color television system currently used in the United States; also the common name of the NTSC-established color system. NTSC is used throughout North America and Central America, except for the French islands of St. Pierre and Miquelon. It is also used in much of the Caribbean and in parts of South America, Asia and the Pacific. It is also broadcast at U.S. military installations throughout the world and at some oil facilities in the Middle East. Barbados was the only country in the world to transmit NTSC color on a non-525-line system; they have since switched to 525 lines. Brazil remains the only 525-line country to transmit color TV that is not NTSC.

PAL (Phase Alternation by Line) is a common composite color transmission system (like NTSC) used in many countries tries of the world where there are 625 scanning lines per frame and 25 frames per second. Brazil is the only known frame and 25 frames per second. Brazil is the only known country transmitting PAL on 525-60 systems.

B-Y (U) is a chrominance component of the video signal that represents the chroma amplitude of the 0/180° subcarrier (sometimes referred to as U in PAL).

R-Y (V) is a chrominance component of the video signal that represents the chroma amplitude of the 90/270° subcarrier (sometimes referred to as V in PAL).

Y (Luminance) is a component of the video signal that represents the brightness of the visual information, so named because it is in the Y-axis of the spectral sensitivity chart for the human visual system.

COMPOSITE is a television system in which chrominance and luminance components of the video signal are combined into a single signal, as they are in NTSC or PAL; any single signal comprised of several components.

SUBCARRIER is an auxiliary information carrier added to the main baseband signal prior to modulation. The most common example in television is the NTSC color subcarrier. Many TV schemes propose adding additional subcarriers to NTSC.

FIELD is one continuous vertical scan of an image. In a progressive scanning system, all of the scanning lines comprising a frame also comprise a field. In an interlaced scanning system, all of the odd-numbered scanning lines comprise a field, and two sequential fields comprise a frame.

FRAME is one complete vertical scan of an image for a progressive scanning system. A frame comprised of two fields in an interlaced scanning system.

Referring now to FIG. 1, video encoder 10 receives graphic video inputs Y (12); R-Y (14) and B-Y (16). Encoder 10 forms a (sign-inverted) composite video signal 22 which is input to (sign-inverting) adder 30.

Enhancement circuit 20 also receives the Y, B-Y and R-Y signals 12, 14, 16 to form a (sign-inverted) enhanced signal 24, which is also input to (sign-inverting) adder 30, which adds the (sign-inverted) composite signal 22 and a (sign-inverted) enhanced signal 24 to form a (non-inverted) enhanced video signal 34, which contains color-difference details that exceed the NTSC-legal chroma bandwidth but are within the NTSC-legal luminance bandwidth, as described above.

In FIG. 1, the color enhancement circuit 20 extracts "sine-squared" (haversine) pulses representing (sign-inverted) absolute values for the derivatives of R-Y and B-Y color difference "sine-squared" transitions; multiplies by offset, sign-inverted luminance, and adds in (sign-inverting) adder 30 the (sign-inverted) luminance-weighted "sine-squared" pulses to the (sign-inverted) composite video 22 as color enhancement signals which exceed the NTSC-legal chroma bandwidth but are within the NTSC-legal luminance bandwidth. The pulses augment luminance during chroma transitions, restoring luminance contributions from chrominance which are lost when chroma subcarrier packet risetimes and bandwidth are limited by NTSC broadcast requirements.

Figure 2:
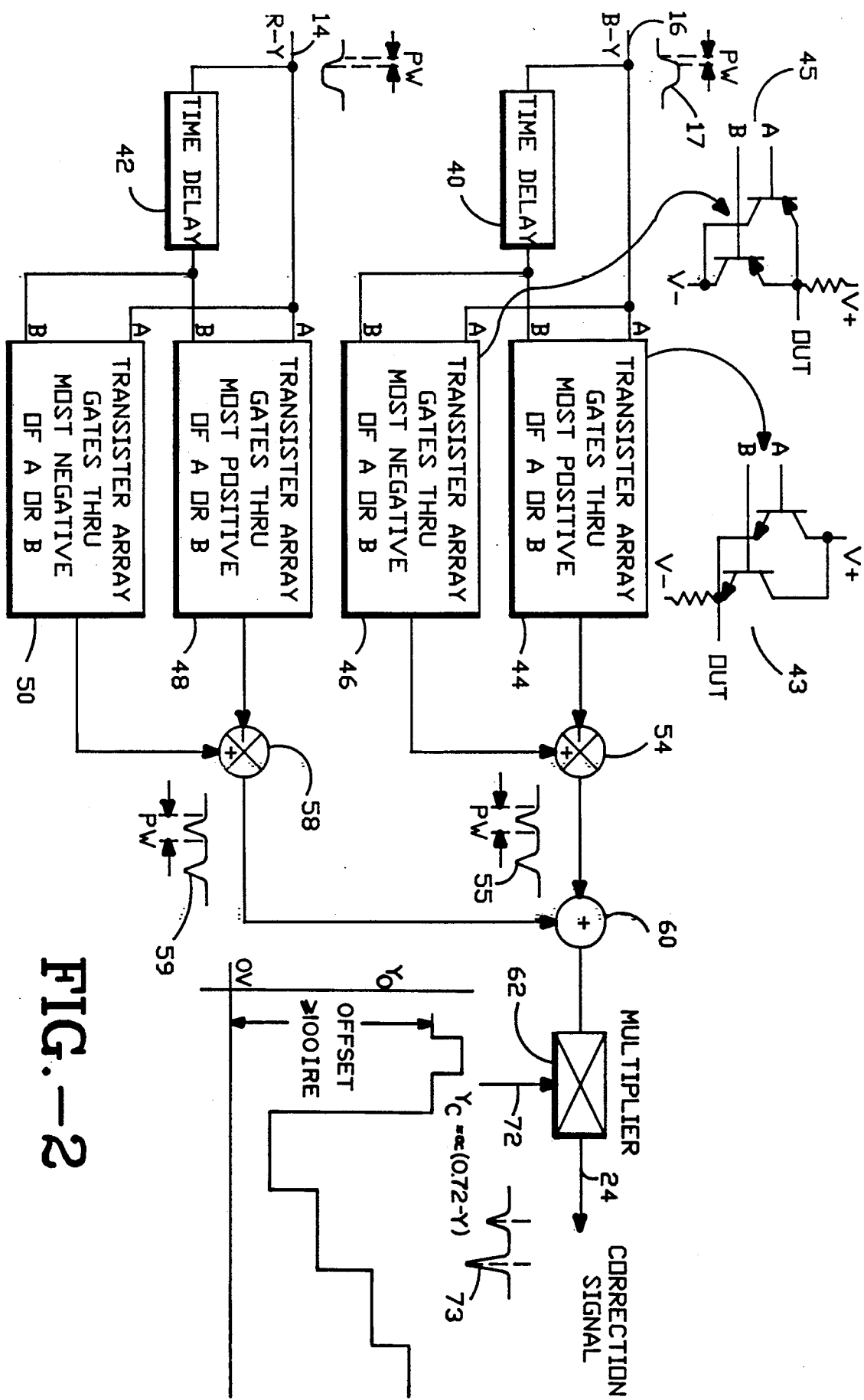
FIG. 2 depicts a more detailed diagram of a color enhancement circuit which forms a portion of FIG. 1.

The color enhancement circuit 20 of FIG. 1 is shown in more detail in FIG. 2. In FIG. 2, a B-Y difference signal is input to the color enhancement circuit 20 to a transistor array 44 (as input A) and transistor array 46 (as input A). The B-Y signal 16 is also input through a time delay circuit 40 to transistor array 44 as input B, and to transistor array 46 as input B. The appropriate pulsewidth of the B-Y signal 16 is seen as signal 17 in FIG. 2.

Transistor array 44 gates through the most positive of inputs A or B as an input to adder 54. The schematic configuration of transistor array 44 is shown as circuit 43 in FIG. 2. Transistor array 46 gates through the most negative of inputs A or B as an input to adder 54.

The schematic configuration of transistor array 46 is shown as circuit 45 of FIG. 2. The output of adder 54 is signal 55, which is input to adder 60 of FIG. 2.

In FIG. 2, the R-Y signal is similarly input to color enhancement circuit 20. The signal 14 is input A to transistor arrays 48, 50. R-Y signal is input through time delay 42 as an input B to transistor arrays 48, 50.

Transistor array 48 gates through the most positive of the A or B inputs. Similarly, transistor array 50 gates through the most negative of inputs A or B. The outputs of transistor array 48, 50 are input to adder 58, the output of which is signal 59. Signals 55, 59 are input to adder 60, the added output of which is input to multiplier 62.

The $Y_C$ signal 72 is also an input to multiplier 62, the multiplied output of which is a correction signal and depicted as signal 73 and output on lead 24 (which corresponds to that of FIG. 1).

In FIG. 2, the input and adder circuits create (inverted) absolute-value derivative pulses by, first, time delaying the color difference signal by an amount which is small relative to its minimum risetime. Then the circuit uses a transistor array to perform a "linear OR" function, subtracting the instantaneously most positive value of either the original color difference signal or its delayed version from the instantaneously most negative value of either the original color difference or its delayed version. For "sine-squared" shaped color difference level transitions, whether positive or negative, the result is always a negative-going pulse of amplitude proportional to the absolute magnitude of the transition.

The multiplier circuit 62 of FIG. 2 performs a multiplication by offset, sign-inverted luminance which approximates multiplication by the inverse of luminance to within $+/-10\%$ over a 2:1 luminance range. This is a desirable weighting scheme because NTSC-defined colors with a low luminance (Y) component derive relatively more of their visible brightness from chrominance components. Chrominance subcarrier packet risetime limiting therefore visibly darkens color transitions with low luminance more than color transitions involving relatively high luminance. The resultant augmentation of luminance during color transitions sharpens the apparent resolution on television receiver or monitor cathode ray tubes (regardless of achievable gamma factors) without extending chrominance bandwidth requirements necessary to prevent chrominance-luminance crosstalk.

Figure 3B:
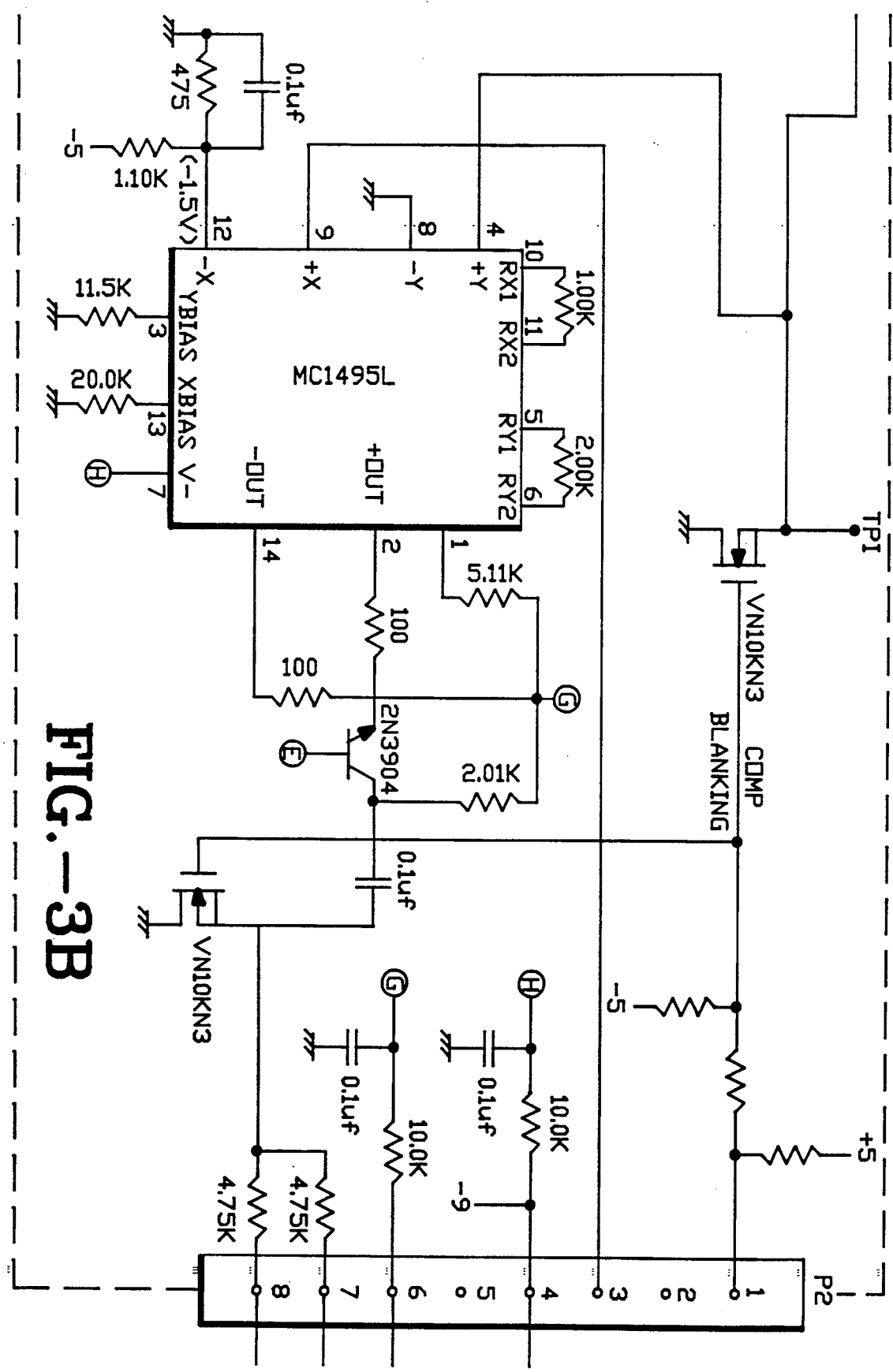

FIG. 3A and 3B depict complete circuit diagram of the enhancement circuit 20 of FIG. 2 and would be understood by one of ordinary skill in the art.

The foregoing description of the preferred embodiment of the invention has been presented for purposes of illustration and description. It is not intended to be exhaustive or to limit the invention to the precise form disclosed, and many modifications and variations are possible in light of the above teaching. The preferred embodiment was chosen and described in order to best explain the principles of the invention and its practical applications to thereby enable others skilled in the art to best utilize the invention and various embodiments and with various modifications as are suited to the particular use contemplated. It is intended that the scope of the invention be defined only by the claims appended hereto.

What is claimed is:

1. A video graphic signal enhancement circuit for generating an enhanced video signal for a video standard, wherein said video standard has a certain legal chroma and luminance bandwidth, said circuit comprising
    video encoder means for receiving a first luminance signal, a first chrominance difference signal and a second chrominance difference signal to form a composite video signal,
    enhancement means for receiving said first luminance signal and said first and second difference signals to form an enhancement signal, and
    means for adding said composite signal and said enhancement signal to form an enhanced video signal which contains color differences that exceed said video standard legal chroma bandwidth and which is within said video standard legal luminance bandwidth.

2. A circuit as in claim 1 wherein said enhancement means include means for time delaying said first and second difference signals to form first and second delayed signals,
    first and second pairs of transistor arrays for each of said difference and delayed signals, said first pair of transistor arrays gating through the most positive of its inputs and said second pair gating through the most negative of its inputs, and
    means for adding the outputs of said transistor arrays to form said enhanced signal.

3. A video graphics enhancement circuit as in claim 2 including means for forming a single polarity enhancement signal from positive or negative transitions of said first and second difference signals.

4. A video graphics enhancement circuit as in claim 3 including means for forming said enhancement signal proportional to the transition risetime and transition amplitudes of said first and second difference signals.

5. A video graphics enhancement circuit as in claim 4 including means for deriving said enhancement signal from said difference and said delayed difference signals.

6. A video graphics enhancement circuit as in claim 5 wherein the amplitude of said enhancement signal is derived from modifying said enhancement signal and is inversely proportional to the luminance amplitude of said composite signal.

7. A video graphics signal enhancement circuit for forming an enhanced signal to be added to a composite signal to form an enhanced video signal for a video standard wherein said video standard has a certain legal chroma bandwidth and luminance bandwidth, said circuit comprising means for receiving a first luminance signal, a first chrominance difference signal and a second chrominance difference signal, and means for forming said enhanced signal which contains color differences that exceed said video standard legal chroma bandwidth and which is within said video standard legal luminance bandwidth.

8. In a video graphic signal enhancement circuit for generating an enhanced video signal for a video standard wherein said video standard has a certain legal chroma and luminance bandwidth, the method comprising the steps of receiving a first luminance signal, a first chrominance difference signal and a second chrominance difference signal to form a composite video signal, receiving said first luminance signal and said first and second difference signals to form an enhancement signal, and adding said composite signal and said enhancement signal to form an enhanced video signal which contains color differences that exceed said video standard legal chroma bandwidth and which is within said video standard legal luminance bandwidth.

* * * * *